United States Patent
Tajiri (10) Patent No.: US 7,616,379 B2
(45) Date of Patent: Nov. 10, 2009

(54) ONE-DIMENSIONAL ILLUMINATION APPARATUS AND IMAGE GENERATING APPARATUS

(75) Inventor: Shinichiro Tajiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/895,554

(22) Filed: Aug. 24, 2007

(65) Prior Publication Data

US 2008/0062501 A1 Mar. 13, 2008

(30) Foreign Application Priority Data

Sep. 8, 2006 (JP) ............................ P2006-244614

(51) Int. Cl.
*G02B 27/10* (2006.01)
(52) U.S. Cl. ...................... 359/619; 359/621
(58) Field of Classification Search ................. 359/619
See application file for complete search history.

(56) References Cited

U.S. PATENT DOCUMENTS

| | | | | |
|---|---|---|---|---|
| 5,923,475 A | * | 7/1999 | Kurtz et al. | 359/619 |
| 6,577,429 B1 | * | 6/2003 | Kurtz et al. | 359/279 |
| 6,650,480 B2 | * | 11/2003 | Tanaka | 359/618 |
| 2007/0046921 A1 | * | 3/2007 | Takahashi et al. | 355/71 |

FOREIGN PATENT DOCUMENTS

| | | |
|---|---|---|
| JP | 10-284778 | 10/1998 |
| JP | 2000-138409 | 5/2000 |
| JP | 2004-012757 | 1/2004 |
| JP | 2004-095792 | 3/2004 |
| JP | 2005-331906 | 12/2005 |
| JP | 2006-049656 | 2/2006 |

\* cited by examiner

*Primary Examiner*—Jordan M. Schwartz
*Assistant Examiner*—James C Jones
(74) *Attorney, Agent, or Firm*—Robert J. Depke; Rockey, Depke & Lyons, LLC

(57) ABSTRACT

A one-dimensional illumination apparatus includes: a light source including a plurality of laser devices arrayed one-dimensionally; a wavefront dividing unit including one or more cylindrical lens arrays for dividing a wavefront of light emitted from the light source and superimposing divided wavefronts; a waveform superimposing unit for introducing light from the wavefront dividing unit to an object and superimposing divided wavefronts; and a polarization converting unit for rotating a plane of polarization of one laser beam of a pair of adjacent laser beams divided by the wavefront dividing unit. The polarization converting unit is located right in front of or right behind an optical element through which laser light from the light source finally passes in the wavefront dividing unit.

8 Claims, 10 Drawing Sheets

ONE-DIMENSIONAL ILLUMINATION APPARATUS AND IMAGE GENERATING APPARATUS

CROSS REFERENCES TO RELATED APPLICATIONS

The present invention contains subject matter related to Japanese Patent Application JP 2006-244614 filed in the Japanese Patent Office on Sep. 8, 2006, the entire contents of which being incorporated herein by reference.

BACKGROUND OF THE INVENTION

1. Field of the Invention

The present invention relates to a one-dimensional illumination apparatus using an array laser as a light source thereof to emit one-dimensional laser light.

2. Description of the Related Art

A method using a rod lens, a method using a mirror treated by a facet cutting process, a method using a lens array, and the like are known as a method with which one-dimensional laser beams, that is, linear laser beams with a uniform light intensity distribution are obtained. In such a method, a laser light source is used, a wavefront is divided, and the divided wavefronts are superimposed to generate the linear laser beams. However, in any of these methods, fine interference fringes are observed at the focused portion due to spatial coherence inherent in laser light. When a wavefront is divided by a distance shorter than a spatial coherence distance of laser light, divided wavefronts have interference on each other and interference fringes are generated when the divided wavefronts are superimposed.

However, when a wavefront is divided by a distance longer than the spatial coherence distance in actual laser light, since the coherence distance is not so small as compared with a diameter of a beam spot of laser light, it is difficult to obtain a sufficient number of wavefronts. Thus, when the divided wavefronts are superimposed, sufficient uniformity of light intensity may not be obtained. Also, even when the wavefront is divided by a distance longer than the spatial coherence distance, spatial coherence may not be removed completely and interference still remains.

Japanese Unexamined Patent Application Publication No. 2006-49656 and Japanese Unexamined Patent Application Publication No. 2004-12757 propose methods of reducing interference fringes by combining divided wavefronts (or wavefronts to be divided) with an optical path difference longer than a time coherence distance.

Figure 1:
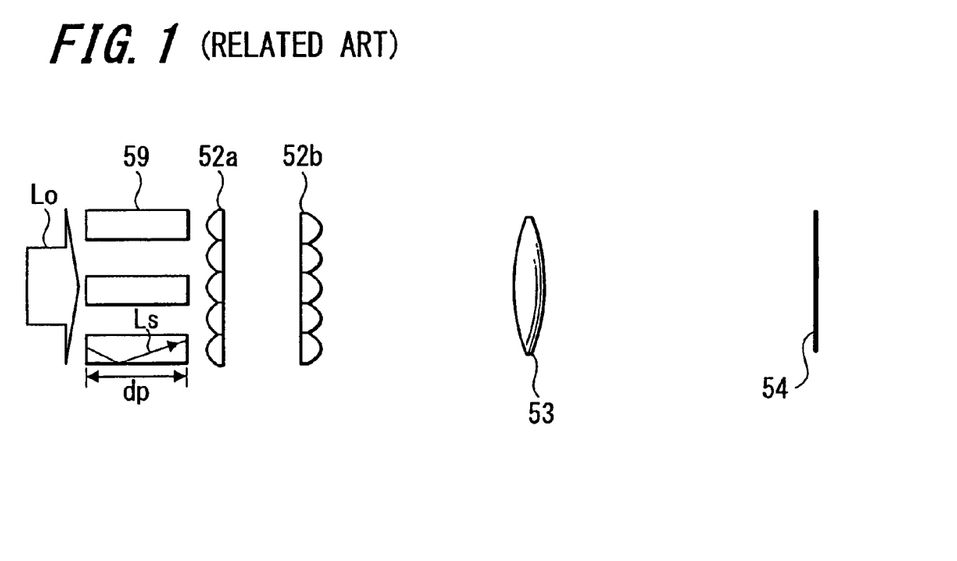
FIG. 1 is a schematic diagram showing an optical system of an example of an illumination apparatus in which interference fringes can be reduced by dividing a wavefront and superimposing divided wavefronts according to the related art.
Figure 2:
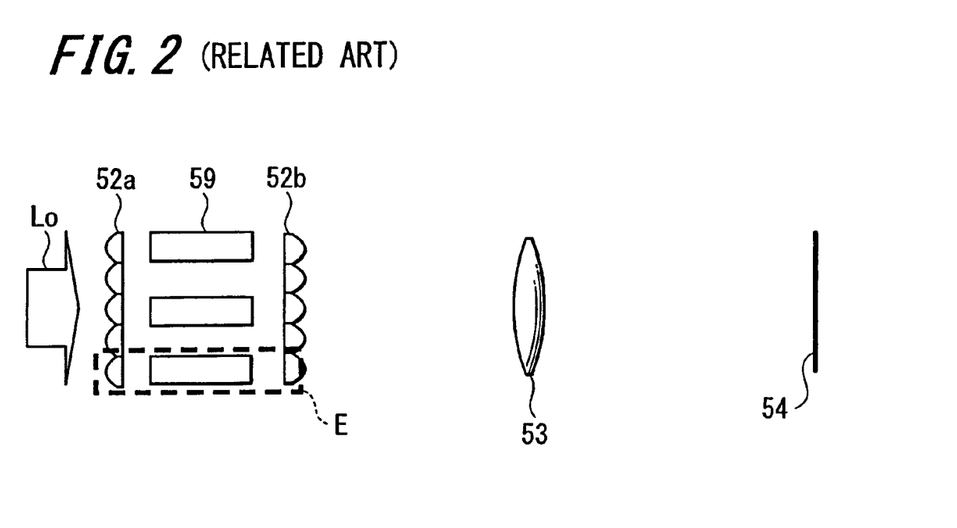
FIG. 2 is a schematic diagram showing an optical system of another example of an illumination apparatus in which interference fringes can be reduced by dividing a wavefront and superimposing divided wavefronts according to the related art.

FIGS. 1 and 2 of the accompanying drawings show schematic diagrams of optical systems of the above-described methods according to the related art. As shown in FIG. 1, laser light Lo emitted from a light source (not shown) passes through an optical path difference generation member 59, which generates an optical path difference. Subsequently, a wavefront thereof is divided by a pair of cylindrical lens arrays 52a and 52b, each having a function of dividing the wavefront and superimposing divided wavefronts. Afterward, an object 54 is illuminated with the laser light passing through a focusing lens 53. As shown in FIG. 2, the optical path difference generation member 59 can be located between the cylindrical lens arrays 52a and 52b.

SUMMARY OF THE INVENTION

However, it is typical for actual lasers to have a time coherence distance of several centimeters or more. Accordingly, in order to obtain a length dp extended in the direction along the light path of the optical path difference generation member 59 shown in FIGS. 1 and 2, a space for the optical path difference generation member 59 may be required, which is disadvantageous for reducing the size of an apparatus. Also, in the case where laser beams are not completely collimated, as shown in FIG. 1, laser light Ls reflected on the side surface of the optical path difference generation member 59 may become stray light. Further, a light path with the optical path difference generation member 59 as shown by a broken line E in FIG. 2 and a light path without an optical path difference generation member have different optical distances, and therefore, efficiency at which laser beams are superimposed is not high, and as a result, efficiency in using light may be lowered.

A one-dimensional illumination apparatus is provided including laser devices arranged one-dimensionally as a light source. In particular, this one-dimensional illumination apparatus is used to illuminate a one-dimensional light modulation apparatus with a desired light intensity distribution to generate one-dimensional image light that is applied to an image generating apparatus which scans and projects images onto a suitable display apparatus such as a screen. In such case, there is a risk that an image is not displayed satisfactorily due to the above-described stray light and lowered efficiency in using light.

In view of the above, it is desirable to provide a one-dimensional illumination apparatus which can reduce interference fringes by dividing a wavefront and superimposing divided wavefronts without lowering efficiency in using light. Further, it is desirable to provide an image generating apparatus using the one-dimensional illumination apparatus and which can generate images by using illumination light with interference fringes being suppressed.

According to an embodiment of the present invention, there is provided a one-dimensional illumination apparatus including a light source, a wavefront dividing unit, a waveform superimposing unit and a polarization converting unit. The light source includes a plurality of laser devices one-dimensionally arrayed. The wavefront dividing unit includes one or more cylindrical lens arrays for dividing a wavefront of light emitted from the light source and superimposing divided wavefronts. The waveform superimposing unit introduces light from the wavefront dividing unit to an object and superimposing divided wavefronts. The polarization converting unit rotates a plane of polarization of one laser beam of a pair of adjacent laser beams divided by the wavefront dividing unit. Further, the polarization converting unit is located right in front of or right behind an optical element through which laser light from the light source passes finally in the wavefront dividing unit.

According to the embodiment of the present invention, two adjacent light paths for a divided wavefront constitute one set and a plane of polarization of a laser beam on one light path is rotated 90 degrees, for example, by the polarization converting unit, thereby reducing interference with a laser beam on the other light path.

Further, according to an embodiment of the present invention, the position, at which the polarization converting unit is located, is determined as follows. Accordingly, in the case where the optical element through which light from the light source finally passes in the wavefront dividing unit includes, for example, two cylindrical lens arrays, the polarization converting unit is located right in front of or right behind the second cylindrical lens array. Therefore, there is a small risk that divided laser light be reflected on the corner and the like of the polarization converting unit, thereby controlling the occurrence of stray light and preventing efficiency in using light from being lowered. A space between the polarization converting unit and the optical element such as the cylindrical lens array may be a distance within a range in which divided laser light may be prevented from reflecting on the corner portion of the polarization converting unit or the like.

In particular, in the case where the polarization converting unit is located right behind the optical element, a difference between optical path lengths of light the polarization plane of which is rotated by the polarization converting unit and of light the polarization plane of which is not rotated can be reduced. Accordingly, difference in magnification and positional displacement on the object illuminated can be suppressed, thereby reducing interference fringes reliably without deteriorating efficiency in using light.

Further, preferably the one-dimensional illumination apparatus according to an embodiment of the present invention is provided to satisfy an equation of $$\cos\{(\psi+\theta)/2\} \leq NA$$

where $\theta$ is an angle at which each laser light emitted from each laser device of the light source is focused or caused to diverge, $\psi$ is an angle at which laser beams emitted from all the laser devices of the light source are focused or caused to diverge and NA is a numerical aperture of a cylindrical lens array on the light incident side provided to the wavefront dividing unit.

According to the above-described arrangement, all laser light emitted from a plurality of laser devices can efficiently be incident on the cylindrical lens arrays of the wavefront dividing unit.

Further, the one-dimensional illumination apparatus according to an embodiment of the present invention, it is desirable that laser light emitted from one laser device of the light source be incident over two or more and less than four lens cells of the cylindrical lens array.

In the case of the above-described arrangement, laser light emitted from one laser device is divided into light beams, and the light beams entering into adjacent pixels can be prevented from interfering with each other by the action of the polarization converting unit even if they are superimposed after being divided, and hence interference fringes can be reduced reliably. In the case of laser light emitted from one laser device is incident over three lens cells, since intensity of laser light incident on the lens cells on both sides are smaller than that of laser light incident on the central lens cell, an influence of the interference fringes is negligible.

On the other hand, when laser light is incident over four or more lens cells, since intensity of laser light incident on alternate lens cells may not be low, there is a risk that interference fringes may not be reduced sufficiently. If laser light emitted from one laser device is incident on less than two lens cells, then intensity of laser light is not sufficiently uniform after dividing the wavefront and superimposing divided wavefronts, and the effect of reducing interference fringes may not be obtained sufficiently.

Accordingly, if the one-dimensional illumination apparatus is configured such that laser light emitted from one laser device of the light source is incident on two or more and less than four lens cells of the cylindrical lens array, then it is possible to suppress interference fringes most efficiently.

Further, according to another embodiment of the present invention, there is provided an image generating apparatus including a light source, a one-dimensional illumination apparatus, a one-dimensional light modulation apparatus, a projection optical unit and a scanning optical unit, and using the one-dimensional illumination apparatus having the arrangement according to an embodiment of the present invention.

According to an embodiment of the image generating apparatus of the present invention, it is possible to generate images using illumination light the interference of which is reduced without deteriorating efficiency in using light in the one-dimensional illumination apparatus.

According to an embodiment of the one-dimensional illumination apparatus of the present invention, it is possible to reduce interference fringes by dividing a wavefront and superimposing divided wavefronts without deteriorating efficiency in using light.

According to an embodiment of the image generating apparatus of the present invention, it is possible to generate images using illumination light the interference fringes of which are reduced.

DESCRIPTION OF THE PREFERRED EMBODIMENTS

Embodiments of the present invention will be described below, but it should be appreciated that the present invention is not limited to the embodiments described below.

First, prior to the description of a one-dimensional illumination apparatus according to an embodiment of the present invention, a one-dimensional illumination apparatus having a fundamental arrangement to divide a wavefront and to superimpose divided wavefronts will be described with reference to schematic diagrams of FIGS. 3, 4 and 5.

In such examples, light Lo is emitted from a light source. In the figures, an arrow x shows an x-axis representing a longitudinal direction of light, and light is emitted in a single transverse mode in a y-axis direction shown by an arrow y perpendicular to the longitudinal direction and outgoes in a z-axis direction shown by an arrow z as a one-dimensional (linear) laser beam. The light Lo is divided in wavefront along the x-axis direction, that is, one-dimensional direction, and respective divided wavefronts are superimposed to illuminate an object, for example, a one-dimensional light modulation apparatus. FIGS. 3 and 4 show cross-section along the direction in which the wavefront is divided and along the direction in which the wavefront advances (optical axis).

Figure 3:
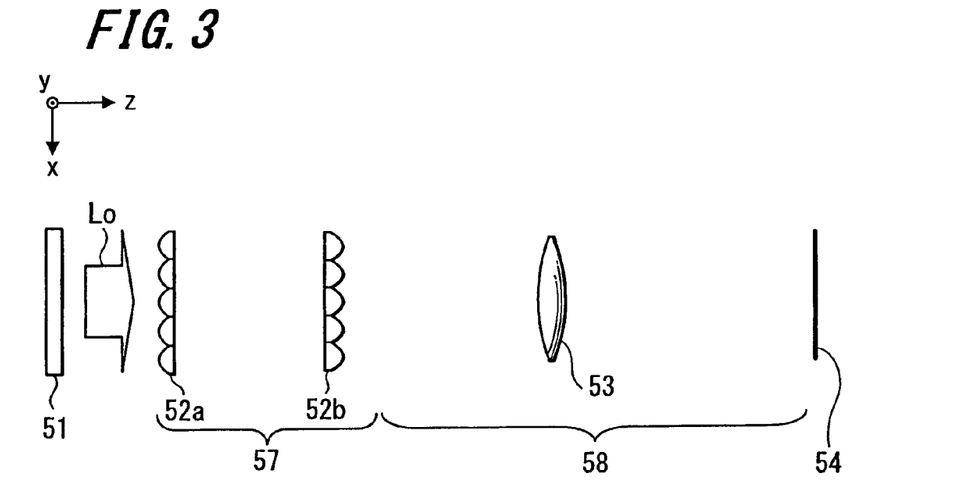
FIG. 3 is a schematic diagram showing an optical system of an example of a fundamental arrangement of a one-dimensional illumination apparatus.
Figure 4:
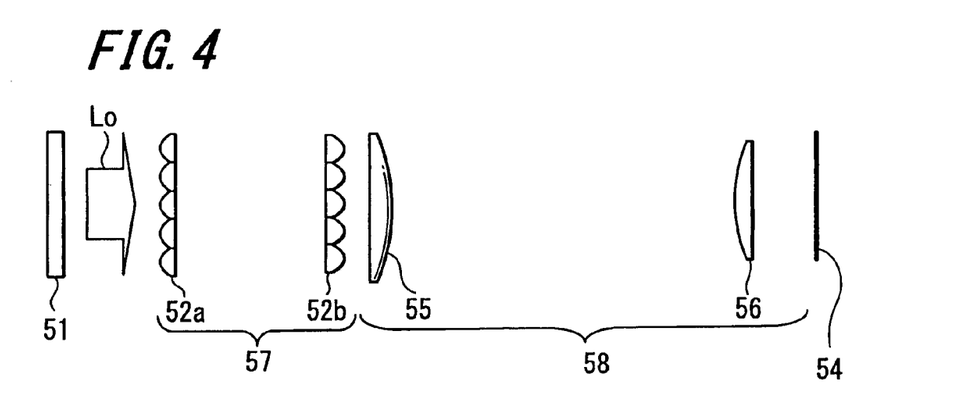
FIG. 4 is a schematic diagram showing an optical system of another example of a fundamental arrangement of a one-dimensional illumination apparatus.

In the examples shown in FIGS. 3 and 4, a wavefront dividing unit 57 includes a pair of cylindrical lens arrays 52a and 52b and these cylindrical lens arrays 52a and 52b are located at each other's focal points. Also, a wavefront superimposing unit 58 has a fundamental arrangement formed of a single focusing lens 53 such as a convex lens as shown in FIG. 3. Alternatively, the wavefront superimposing unit 58 has a fundamental arrangement formed of a combination of two optical lenses 55 and 56 such as plano-convex lenses. Further, an optical system having various other arrangements also can be used. The wavefront superimposing unit 58 may be required to have a function of superimposing the divided wavefronts at desired positions on an object 54 to be illuminated.

Figure 5:
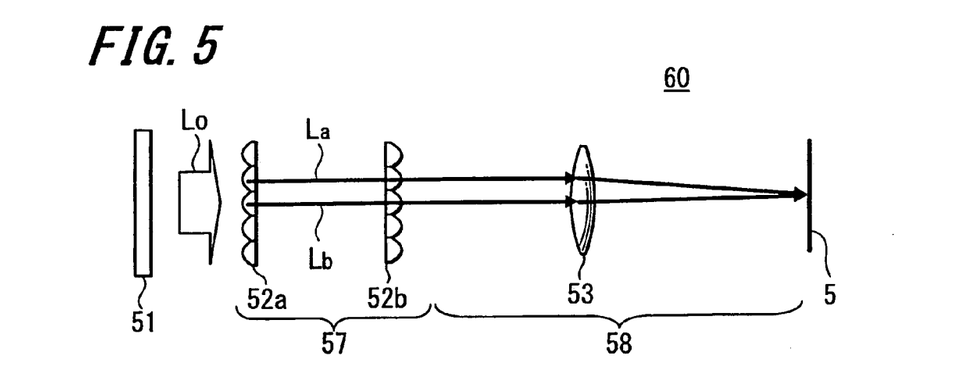
FIG. 5 is a schematic diagram showing a state in which interference occurs in an optical system of an example of a one-dimensional illumination apparatus.

As shown in FIG. 5, if a wavefront is divided and afterward, divided wavefronts are superimposed, interference fringes may be generated when the divided wavefronts are superimposed, since adjacent laser beams have interference. In FIG. 5, elements and parts corresponding to those in FIGS. 3 and 4 are denoted by the same reference numerals and are not described repeatedly.

Figure 6:
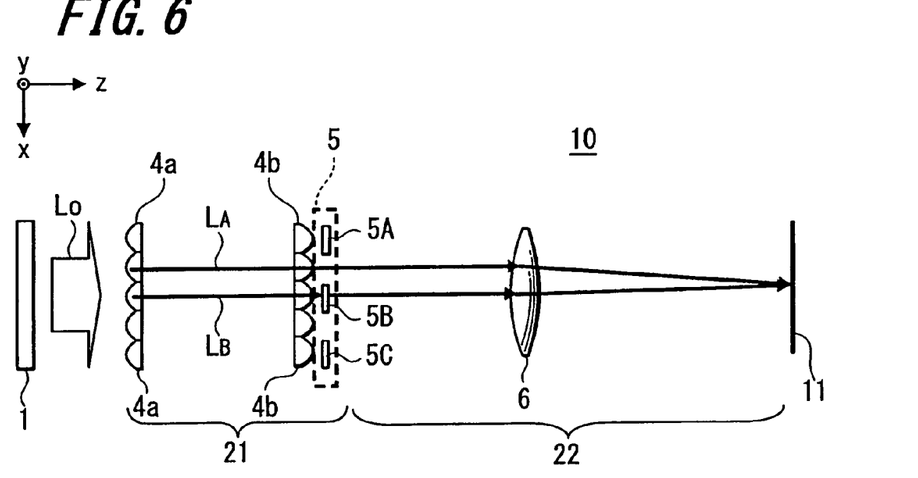
FIG. 6 is a schematic diagram showing an example of a one-dimensional illumination apparatus according to an embodiment of the present invention.

FIG. 6 is a schematic diagram showing an example of a one-dimensional illumination apparatus according to an embodiment of the present invention. Also in this case, an arrow x shows an x-axis representing a longitudinal direction of light, and light Lo is emitted in a single transverse mode in a y-axis direction shown by an arrow y perpendicular to the longitudinal direction, and outgoes in a z-axis direction shown by an arrow z as a one-dimensional (linear) laser beam. Further, a one-dimensional illumination apparatus 10 shown in FIG. 6 includes a pair of cylindrical lenses 4a and 4b as a wavefront dividing unit 21 and a focusing lens 6 formed of a suitable lens such as a plano-convex lens as a wavefront superimposing unit 22. A polarization converting unit 5 for rotating a plane of polarization of an adjacent laser beam approximately 90 degrees is located right in front of or right behind, in this case, right behind the cylindrical lens array 4b of the cylindrical lenses 4a and 4b, which is the last optical element through which light passes. As the polarization converting unit 5, it is possible to use a wavelength film, a thin film wave plate, a crystal wave plate, a Fresnel rhomb and the like. Alternatively, a polarization converting device such as a wavelength film may be provided to a part of a light transmissible substrate having no polarization converting function. Since the polarization converting unit 5 with the above-described arrangement is located right behind the cylindrical lens array 4b, it is possible to reduce interference even when wavefronts of the adjacent laser beams LA and LB are superimposed on an object 11. It should be noted that any polarization converting units may be used as the polarization converting unit 5 as long as they have a function of rotating a plane of polarization approximately 90 degrees. Hence, the polarization converting unit is not limited to the above-described example of the polarization converting unit 5. Also, it is most desirable that a plane of polarization should be rotated 90 degrees. However, even when a plane of polarization is not rotated 90 degrees accurately, there can be obtained the effect to reduce interference.

Figure 7:
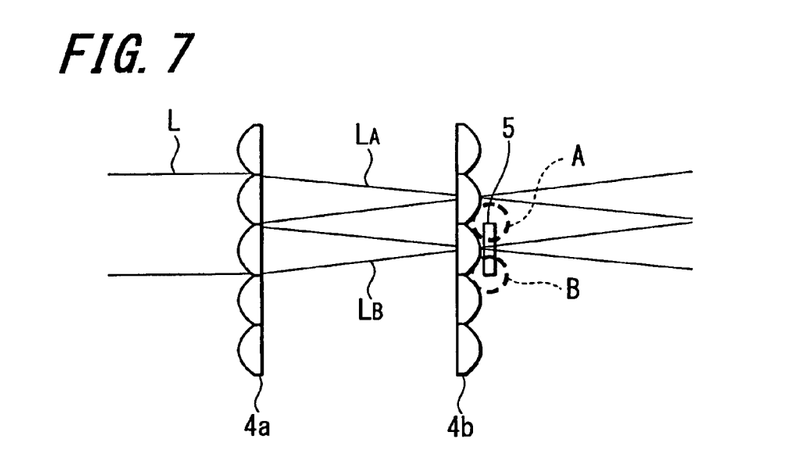
FIG. 7 is a schematic diagram showing main portions of an example of a one-dimensional illumination apparatus according to the embodiment of the present invention.

FIG. 7 is a schematic diagram showing main portions of the one-dimensional illumination apparatus in an enlarged-scale. In this case, since the laser beams LA and LB tend to pass through other portions than corner portions (edges), as shown by broken lines A and B, of the inserted polarization converting unit 5, the laser beams LA and LB can be controlled not to be scattered, and hence occurrence of stray light can be suppressed. A space between the polarization converting unit 5 and the cylindrical lens array 4b may be selected in the range in which the laser beams LA and LB can be prevented from being applied to the corner portions of the polarization converting unit 5. In particular, in the case where the polarization converting unit 5 is not located right in front of the cylindrical lens array 4b but located right behind the cylindrical lens array 4b as shown in this example, the optical path length is not changed within the wavefront dividing unit 21. Accordingly, difference in magnification and positional displacement are hardly generated at the focusing position and the above-described arrangement is the most preferable arrangement. In FIG. 7, elements and parts corresponding to those in FIG. 6 are denoted by the same reference numerals and are not described repeatedly.

Figure 8:
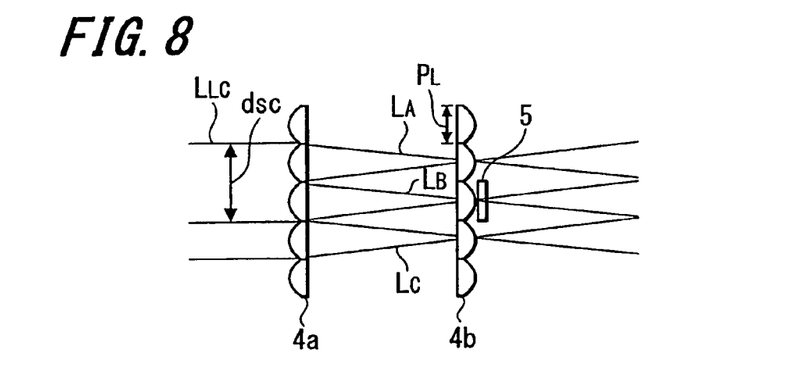
FIG. 8 is a schematic diagram showing main portions of an example of a one-dimensional illumination apparatus according to the embodiment of the present invention.

Further, FIG. 8 shows an example of main portions of a one-dimensional illumination apparatus according to an embodiment of the present invention. As shown in FIG. 8, in the case where $d_{sc}$ is a spatial coherence distance of laser light used, it is desirable that a pitch $P_L$ of the lens cells of the cylindrical lens arrays $4a$ and $4b$ should be approximately ½ the spatial coherence distance $d_{sc}$. According to this arrangement, the occurrence of interference fringes can be suppressed most efficiently by rotating the plane of polarization of one of the adjacent laser beams LA and LB about 90 degrees. In actual practice, since interference of laser light is not removed completely at a pitch larger than the spatial coherence distance, if the pitch of the lens cell is smaller than ½ the spatial coherence distance, interference can be suppressed to a certain degree. However, in order to suppress interference with high reliability, it is desirable that $P_L \cong d_{sc}/2$ should be satisfied.

Figure 9:
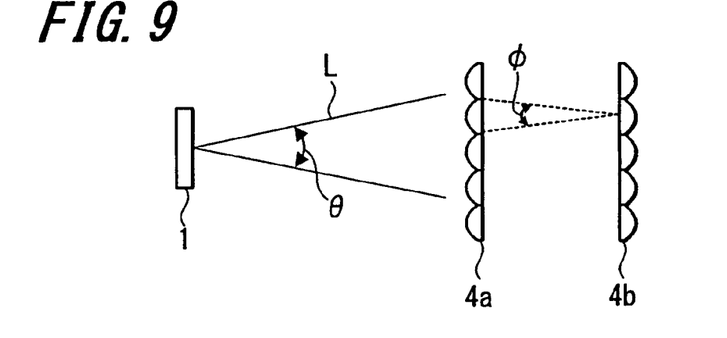
FIG. 9 is a schematic diagram showing main portions of an example of a one-dimensional illumination apparatus according to the embodiment of the present invention.

Further, FIG. 9 is a schematic diagram of main portions of a one-dimensional illumination apparatus according to an embodiment of the present invention. As shown in FIG. 9, a divergent angle θ of respective laser devices one-dimensionally arrayed to form the light source 1 may not be parallel to the direction in which the wavefront is divided. The angle θ may be expanded to be somewhat smaller than a coupling angle φ of the cylindrical lens array $4a$ forming the wavefront dividing unit, and laser light may be incident on the cylindrical lens array $4a$ at that angle. In this regard, θ≦φ should be satisfied, where θ is the divergent angle of the laser device. In FIG. 9, elements and parts corresponding to those in FIG. 6 are denoted by the same reference numerals and are not described repeatedly. The smaller the difference between the divergent angle θ of the laser device and the coupling angle φ of the cylindrical lens arrays $4a$ and $4b$ becomes, the more effectiveness for reducing interference fringes is obtained. If the divergent angle θ of the laser device is selected to be larger than the coupling angle φ of the cylindrical lens array $4a$ to satisfy θ>φ, then part of light becomes stray light, causing a loss of efficiency in the optical system. It should be noted that, in order to reliably suppress the occurrence of stray light, the divergent angle θ of the laser device should be more desirably selected to satisfy θ<φ.

In the case where light is incident on the cylindrical lens array $4a$ from the light source in the form of parallel rays of light, even if interference fringes are reduced by the above-described arrangement, interference fringes may be generated by slightly-remaining interference.

On the other hand, if light emitted from the light source has the focusing or divergent angle θ, it is possible to reduce intensity of interference of remaining interference fringes. Also, as a secondary effect, there can be obtained an effect of light not being affected by surface roughness of the cylindrical lens array. This secondary effect will be described with reference to FIGS. 10A, 10B and FIGS. 11A, 11B.

Figure 10A:
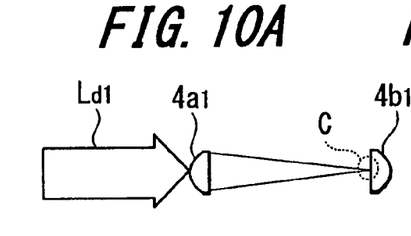
FIG. 10A is a schematic diagram showing main portions of an example of a one-dimensional illumination apparatus according to the embodiment of the present invention and FIG. 10B is a diagram showing a light intensity distribution in an area shown by a broken line C in FIG. 10A.
Figure 10B:
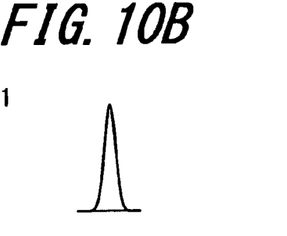

FIG. 10A shows a case in which parallel light $L_{d1}$ is incident on a cylindrical lens array. A laser beam divided by one lens cell $4a_1$ of the cylindrical lens array $4a$ is focused on the surface of one lens cell $4b_1$ of the other cylindrical lens array $4b$ at its relatively small area. Therefore, the beam is easily affected by surface roughness and dusts and smudges on the surface of the cylindrical lens array. Accordingly, a light intensity distribution of an area shown by a broken line C in FIG. 10A has a light intensity distribution with a high peak as shown in FIG. 10B so that intensity of interference increases.

Figure 11A:
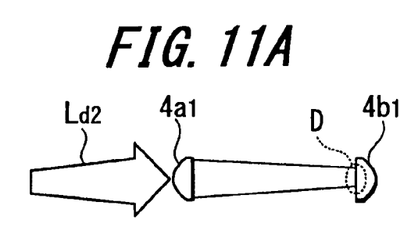
FIG. 11A is a schematic diagram showing main portions of an example of a one-dimensional illumination apparatus according to the embodiment of the present invention.
Figure 11B:
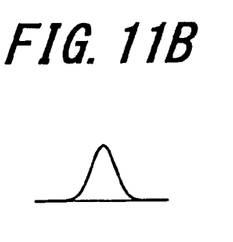
FIG. 11B is a diagram showing a light intensity distribution in an area shown by a broken line D in FIG. 11A.

On the other hand, in the case where focusing or diverging light, in this illustrated example, diverging light $L_{d2}$ is incident on a cylindrical lens array as shown in FIG. 11A, it is focused on the surface of one lens cell $4b_1$ of the cylindrical lens array $4b$ at its relatively wide area. Therefore, the beam is not easily affected by surface roughness and dusts and smudges on the surface of the cylindrical lens array. Further, a light intensity distribution of an area shown by a broken line D in FIG. 11A has a broad light intensity distribution with a relatively low peak so that intensity of interference can be suppressed.

Figure 12:
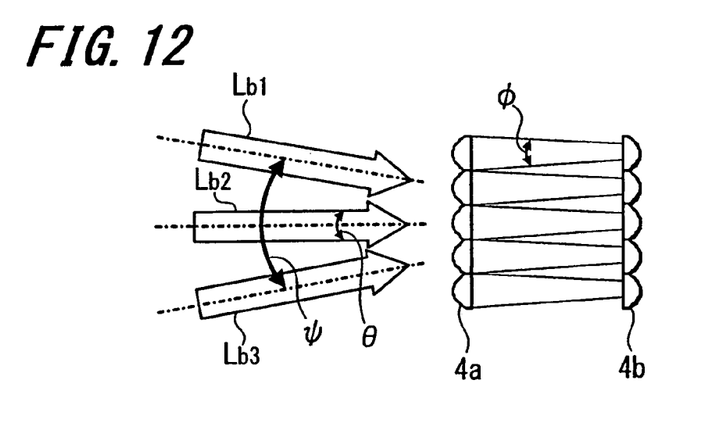
FIG. 12 is a schematic diagram showing main portions of an example of a one-dimensional illumination apparatus according to the embodiment of the present invention.

According to an embodiment of the present invention, a light source includes a plurality of laser devices arrayed one-dimensionally. Laser beams emitted from all laser devices may not be parallel to each other, but the whole of laser beams may have the focusing or divergent angle ψ. FIG. 12 is a schematic diagram showing main portions of a one-dimensional illumination apparatus according to this embodiment. In this regard, preferably, an equation of cos {(ψ+θ)/2}≦NA should be satisfied, where ψ is a focusing or divergent angle formed by respective laser lights $L_{b1}$, $L_{b2}$ and $L_{b3}$ emitted from a plurality of laser devices, θ is a focusing or divergent angle of laser light from each laser device and NA is the numerical aperture of the cylindrical lens array $4a$ on the light incident side provided to a wavefront dividing unit.

According to the above-described arrangement, all laser light emitted from a plurality of laser devices can efficiently be incident on the cylindrical lens arrays of the wavefront dividing unit.

Also, it is desirable that laser light should be incident on the cylindrical lens array at an angle in which a sum of the divergent angle ψ and the focusing or divergent angle θ of laser light of each laser device may be within the coupling angle ψ of the cylindrical lens array $4a$ provided to the wavefront dividing unit. Specifically, the angle ψ is selected to satisfy a relationship represented by

ψ+θ≦φ

It should be noted that any of these angles ψ, θ and φ is an angle formed with a direction parallel to the optical axis direction of the cylindrical lens.

Laser light from the light source may have the focusing or divergent angle ψ through optical elements such as prisms and mirrors, or by arranging laser devices with an angle in between. According to the above-described arrangement, effects similar to those described above can be obtained.

Figures 13, 14:
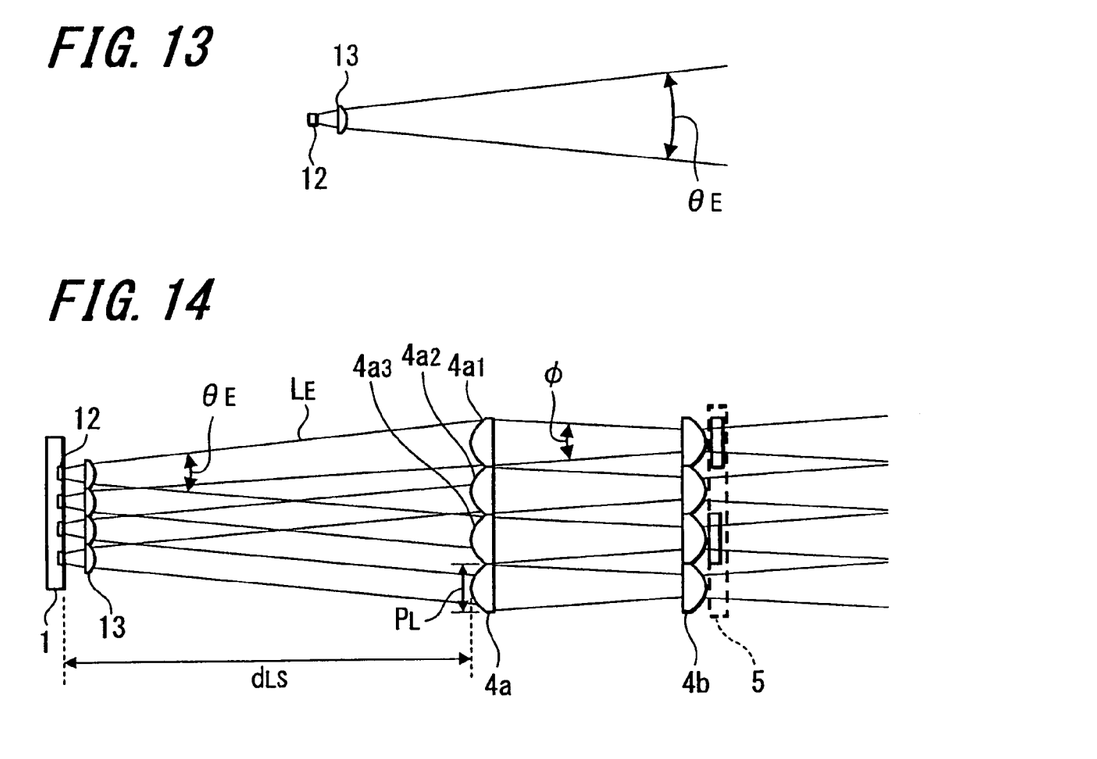
FIG. 13 is a schematic diagram showing main portions of an example of a one-dimensional illumination apparatus according to the embodiment of the present invention.
FIG. 14 is a schematic diagram showing main portions of an example of a one-dimensional illumination apparatus according to the embodiment of the present invention.

FIG. 13 is a schematic diagram showing main portions of a one-dimensional illumination apparatus according to an embodiment of the present invention. In this embodiment, a laser light source such as a semiconductor laser bar in which a laser device is integrated with a light source is used as a light source, as shown in FIG. 13, and a collimator lens 13 is arranged in front of the light exit end of each laser device 12. Laser light emitted from each laser device 12 has a divergent angle $θ_E$ determined by the size of the laser device 12 and a focal length of the collimator lens 13. In particular, since laser light with high output is generated from the laser device 12 of relatively large size, the divergent angle $θ_E$ thereof may be relatively large.

FIG. 14 is a schematic diagram showing a one-dimensional illumination apparatus according to an embodiment of the present invention. In this case, as shown in FIG. 14, stray light can be suppressed by a wavefront dividing unit formed of the cylindrical lens array $4a$ having a coupling angle φ that satisfies $\theta_E \leq \phi$, more desirably $\theta_E < \phi$ with respect to the divergent angle $\theta_E$ determined by the size of the laser device 12 and the focal length of the collimator lens 13.

Further, at that time, it is desirable that the divergent angle $\theta_E$ of the laser device 12 and a distance $d_{LS}$ between the laser device 12 and the cylindrical lens array 4a should be set such that the laser beam $L_E$ emitted from one laser device 12 may be incident on two or more and less than four lens cells of the cylindrical lens array 4a, that is, lens cells $4a_1$ and $4a_2$, or lens cells $4a_1$, $4a_2$ and $4a_3$.

If the one-dimensional illumination apparatus is configured such that laser light may be incident on two or more lens cells of the cylindrical lens array, then it is possible as described above to obtain one-dimensional illumination light with a more uniform light intensity distribution by the effects obtained when a wavefront is divided and divided wavefronts are superimposed. In addition, the effects to reduce interference fringes can be obtained sufficiently.

Specifically, laser light emitted from one laser device is incident on adjacent two lens cells $4a_1$ and $4a_2$. Light incident on the lens cell $4a_1$ is prevented from interfering with light incident on the lens cell $4a_2$ through the action of the polarization converting unit 5, thereby reducing interference fringes reliably. In the case where light emitted from one laser device is incident on the three lens cells $4a_1$, $4a_2$ and $4a_3$, since light incident on the lens cell $4a_1$ and light incident on the $4a_3$ on both sides are relatively low in intensity as compared with light incident on the central lens cell $4a_2$, influence caused by interference fringes is small.

On the other hand, in the case where light is incident over four or more lens cells, since intensity of light incident on every other lens cells may not be sufficiently small, there is a risk that interference fringes will not be reduced adequately. Further, in the case where light emitted from one laser device is incident on less than two lens cells, intensity may not be sufficiently uniform after dividing the wavefront and superimposing divided wavefronts, and therefore, the effect to reduce interference fringes may not be obtained sufficiently.

Accordingly, interference fringes can be suppressed most efficiently with the arrangement in which light emitted from one laser device is incident on two or more and less than four lens cells as described above.

Specifically, the arrangement represented by $$2 \times P_L \leq d_{LS} \times \tan \theta_E < 4 \times P_L$$

and $$\theta_E \leq \phi$$

preferably $$\theta_E < \phi$$

should be obtained, where $d_{LS}$ is a distance between the laser device 12 and the cylindrical lens array 4a, $P_L$ is a pitch of the lens cells of the cylindrical lens array 4a and $\theta_E$ is a divergent angle of the laser device 12.

According to such arrangement, occurrence of interference fringes can be suppressed reliably, occurrence of stray light can be suppressed, and efficiency in using light can be prevented from lowering or suppressed.

Figure 15:
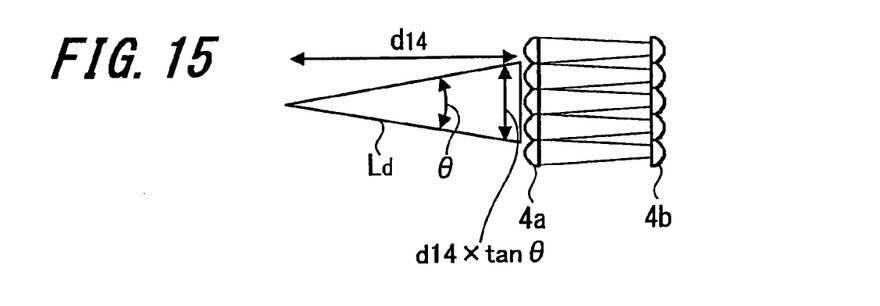
FIG. 15 is a schematic diagram showing main portions of an example of a one-dimensional illumination apparatus according to the embodiment of the present invention.

However, if laser light incident on the cylindrical lens array of the wavefront dividing unit has the focusing or divergent angle $\theta$ as described above, then in the case where a distance between a light source and a cylindrical lens array is relatively long, the following problem may arise. For example, as shown in FIG. 15, when $d_{14}$ is a distance between the light source and the cylindrical lens array 4a, a width of a laser beam Ld incident on the cylindrical lens array 4a is expressed as $d_{14} \times \tan \theta$ ($\theta$ is a divergent angle). At that time, there may be a case in which due to design limits in actual apparatus, the width of the laser beam and the pitch of the lens cells of the cylindrical lens array may not be matched with design values. In FIG. 15, elements and parts corresponding to those in FIG. 6 are denoted by the same reference numerals and are not described repeatedly.

Further, in the case where a mirror to fold an optical system is provided between the light source and the cylindrical lens array in order to reduce the apparatus in size, for example, if laser light has the above-described divergent angle, then there may be caused a disadvantage that the mirror becomes large in size.

Figure 16:
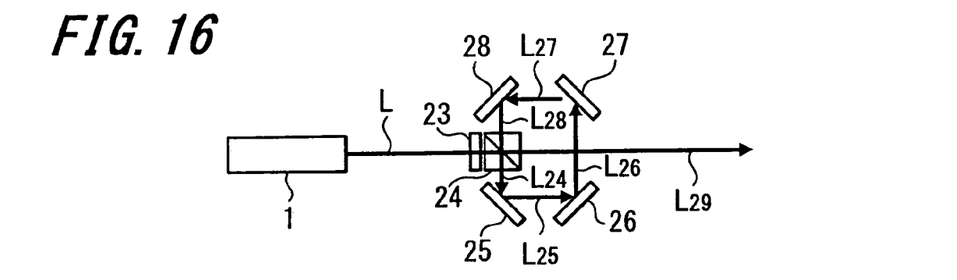
FIG. 16 is a schematic diagram showing an example of an optical delay loop.

As shown in FIG. 16, there may also be caused a disadvantage in the case where an optical delay loop is inserted into the optical system in order to reduce speckle as well. As shown in FIG. 16, light L emitted from the light source 1 passes through a wave-plate 23 and is separated by a polarizing beam splitter 24. Subsequently, the light is reflected by mirrors 25 to 28, passes through a delay loop as shown by arrows $L_{24}$ to $L_{28}$, is again reflected by the polarizing beam splitter 24 and emitted as light $L_{29}$ the speckle of which is suppressed. In the case of providing such optical delay loop, if light from the light source has the divergent angle as described above, each optical element should be made large in size. In addition, since a part of laser beams has a different distance $d_{14}$ due to the length of the optical delay loop, there may be such a problem that the beam width on the cylindrical lens array becomes different.

Figure 17:
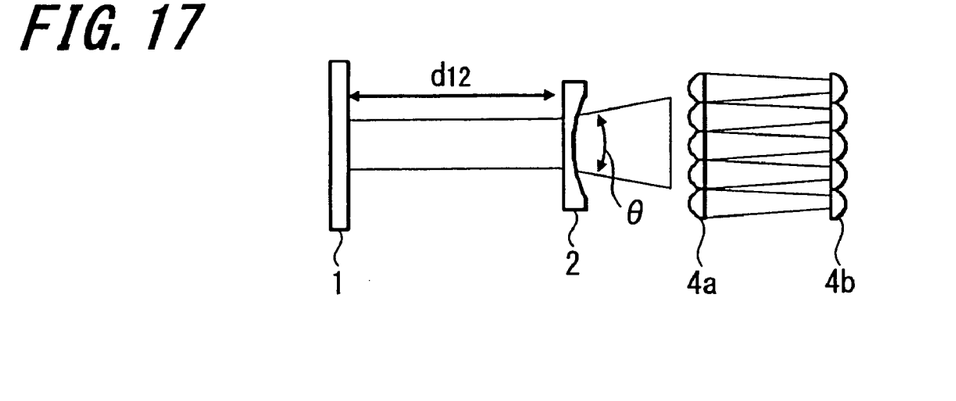
FIG. 17 is a schematic diagram showing main portions of an example of a one-dimensional illumination apparatus according to the embodiment of the present invention.
Figure 18:
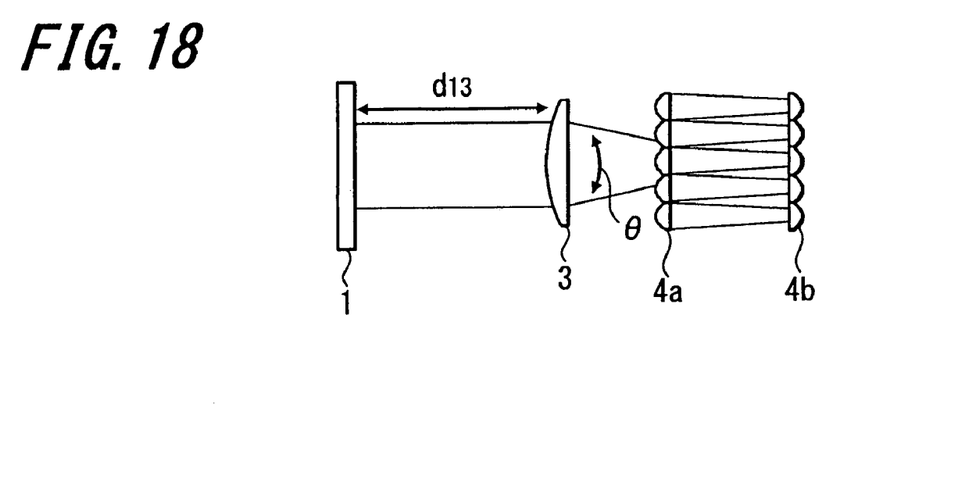
FIG. 18 is a schematic diagram showing main portions of an example of a one-dimensional illumination apparatus according to the embodiment of the present invention.

In order to avoid the above-described problems, it is desirable to provide optical elements having functions as described below. Specifically, such elements as a convex or concave lens and a prism having a function of increasing the divergent angle $\theta$ of laser light should be located so that laser beams emitted from the light source may be parallel or substantially parallel and may have a predetermined divergent angle near the cylindrical lens array of the wavefront dividing unit. FIGS. 17 and 18 are schematic diagrams showing examples in which the concave lens 2 and the convex lens 3 are provided as optical elements, respectively. In FIGS. 17 and 18, elements and parts corresponding to those in FIG. 6 are denoted by the same reference numerals and are not described repeatedly.

Since parallel light is emitted from the light source 1 and the above-described optical elements are disposed, respective distances $d_{12}$ and $d_{13}$ between the light source 1 and these optical elements (concave lens 2 and convex lens 3) can be maintained sufficiently. Also, in the case where a mirror or other elements are inserted between the light source and the wavefront dividing unit, the mirror and the like need not be made large in size more than necessity. In addition, if laser beams with different optical path lengths are incident on the cylindrical lens array in such a case of inserting the optical delay loop or the like into the optical system, diameters of laser beams can be made substantially the same and hence, interference fringes can be reduced efficiently.

Figure 19:
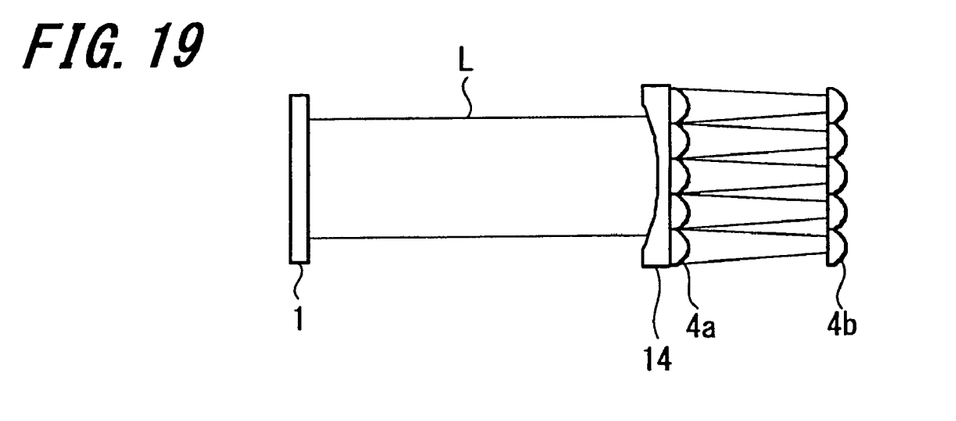
FIG. 19 is a schematic diagram showing main portions of an example of a one-dimensional illumination apparatus according to the embodiment of the present invention.

FIG. 19 is a schematic diagram showing main portions of a one-dimensional illumination apparatus according to an embodiment of the present invention. As shown in FIG. 19, in the case of using the cylindrical lens array as the wavefront dividing unit, an optical element 14 may be integrally formed with the light incident surface of the first cylindrical lens array 4a to have a function of expanding the divergent angle of laser beams up to a predetermined angle. The optical element 14 may have the shape of a convex or concave lens. If such optical assembly having the function of focusing light or causing light to diverge is used, then it is possible to improve adjustment efficiency by reducing the number of planes of optical elements. In addition, it is possible to improve freedom in design of respective optical elements.

With the above-described arrangement, when laser beams are superimposed at the wavefront superimposing unit, it is possible to carry out efficient and uniform one-dimensional illumination with the least interference fringes.

Figure 20:
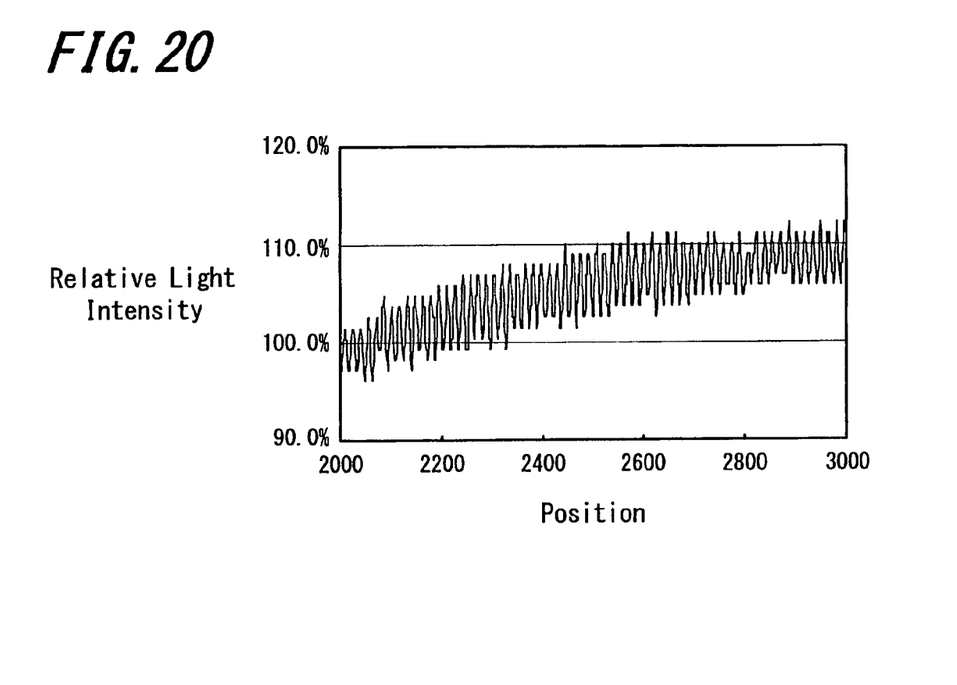
FIG. 20 is a diagram showing a light intensity distribution in an illumination apparatus according to the related art.
Figure 21:
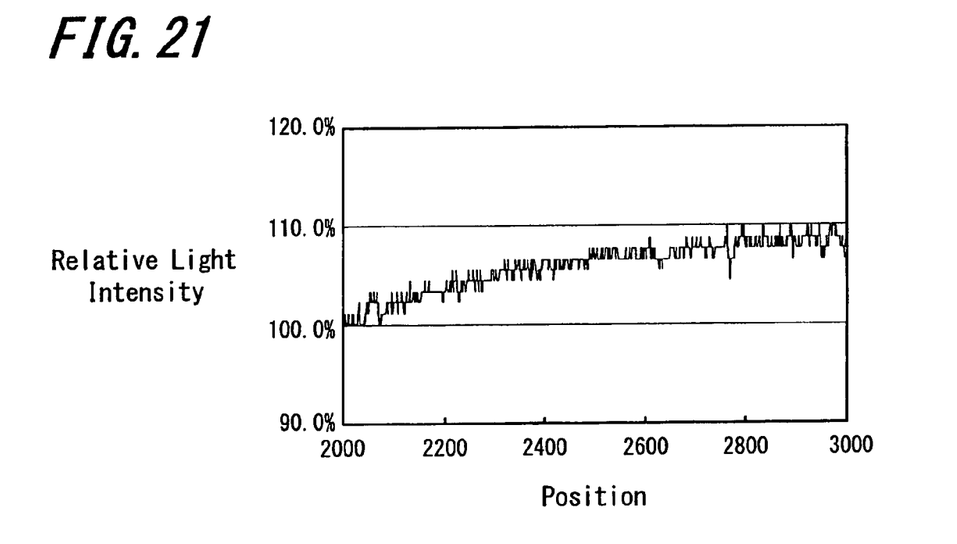
FIG. 21 is a diagram showing a light intensity distribution in a one-dimensional illumination apparatus according to the embodiment of the present invention.

Providing the light source 1 and the wavefront dividing units (cylindrical lens arrays) 4a and 4b located as described above and providing the polarization converting device that rotates a plane of polarization approximately 90 degrees located right behind the cylindrical lens array 4b as the polarization converting unit 5 shown in FIG. 6, interference fringes can be suppressed considerably. FIGS. 20 and 21 illustrate such state. FIG. 20 shows a light intensity distribution of a related-art one-dimensional illumination apparatus without a polarization converting unit, and FIG. 21 shows a light intensity distribution of a one-dimensional illumination apparatus according to an embodiment of the present invention, respectively. It is understood that interference fringes are reduced considerably according to the embodiment of the present invention as shown in FIG. 21, as compared with the comparative example shown in FIG. 20.

As heretofore described, according to embodiments of the one-dimensional illumination apparatus of the present invention, the following effects can be obtained:

(1) The polarization converting unit for rotating the plane of polarization approximately 90 degrees is used and, in particular, the polarization converting unit is located right in front of or right behind the optical element through which light from the wavefront dividing unit passes finally. Accordingly, occurrence of interference fringes can be suppressed reliably and occurrence of stray light can be suppressed. In particular, with the polarization converting unit located right behind the last optical element, the optical path length is not changed within the wavefront dividing unit. Therefore, difference in magnification and positional displacement on the focused position hardly occur and interference fringes can be reduced without deteriorating efficiency in using light.

(2) The one-dimensional illumination apparatus may be configured to satisfy the equation of $$\cos\{(\psi+\theta)/2\} \leq NA$$

where $\theta$ is an angle at which each laser light emitted from each laser device of the light source is focused or caused to diverge, $\psi$ is an angle at which laser beams emitted from all the laser devices of the light source are focused or caused to diverge and NA is a numerical aperture of a cylindrical lens array on the light incident side provided to the wavefront dividing unit. With the above-described arrangement, all laser light emitted from a plurality of laser devices can efficiently be incident on the cylindrical lens arrays of the wavefront dividing unit.

(3) Laser light emitted from one laser device of the light source is incident over two or more and less than four lens cells of the cylindrical lens array. Accordingly, interference fringes can be suppressed most efficiently.

(4) The equation of $$\psi+\theta \leq \phi$$

is satisfied, where $\theta$ is an angle at which each laser light emitted from each laser device of the light source is focused or caused to diverge, $\psi$ is an angle at which laser beams emitted from all the laser devices of the light source are focused or caused to diverge and $\phi$ is a coupling angle of the cylindrical lens arrays. Accordingly, occurrence of stray light can be suppressed and interference fringes can be reduced efficiently.

(5) Intensity of interference in interference fringes can be lowered by diverging or focusing laser beams incident on the wavefront dividing unit. Further, since the area of a laser beam which passes the cylindrical lens array is expanded, it is possible to alleviate influences caused by surface roughness, surface accuracy of the cylindrical lens array and dusts and smudges thereon.

(6) The optical element by which a divergent angle of laser light can be set to a desired angle is located near the cylindrical lens array. Accordingly, interference fringes can be reduced efficiently without being limited by the layout.

(7) In order to obtain the above-described effect (6), the optical element having the function of focusing laser light or causing laser light to diverge is integrally formed with the cylindrical lens array. Accordingly, the number of planes through which light passes can be reduced, thereby improving efficiency of assembling work, since the number of adjustment processes can be reduced. Further, a space in which respective optical components are arranged can be reduced, which can contribute to reduction in weight and size of the one-dimensional illumination apparatus.

Next, an image generating apparatus according an embodiment of the present invention, which uses the above-described one-dimensional illumination apparatus to obtain an image signal, will be described with reference to FIGS. 22 to 25.

Figure 22:
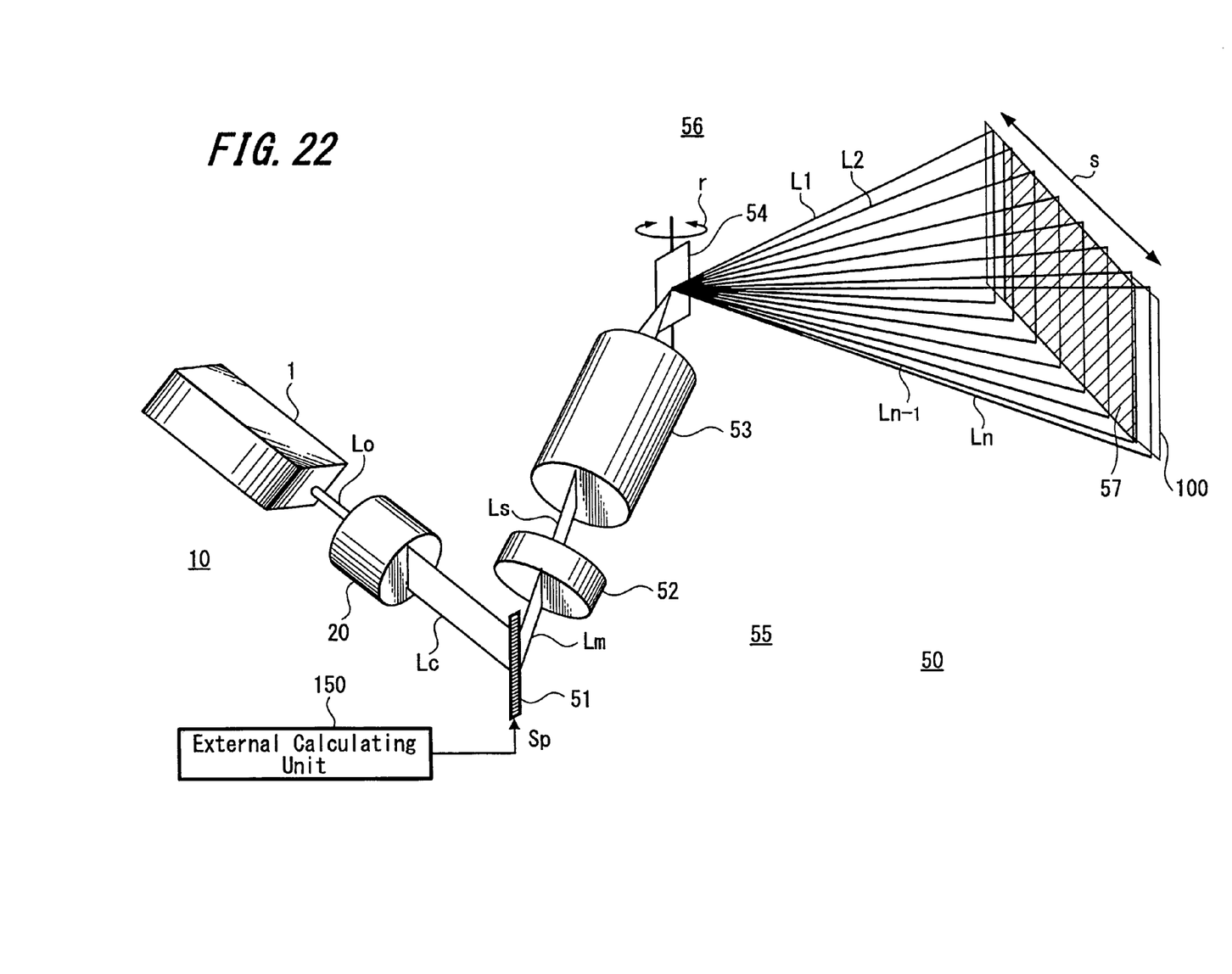
FIG. 22 is a schematic perspective view showing an arrangement of an example of an image generating apparatus according to the embodiment of the present invention.

As shown in FIG. 22, an image generating apparatus 50 includes a one-dimensional illumination apparatus 10, a light modulation unit 55, and a scanning optical unit 56. The one-dimensional illumination apparatus 10 includes a light source 1 and an illumination optical system 20 including the above-described wavefront dividing unit and wavefront superimposing unit. The light modulation unit 55 includes a diffraction grating one-dimensional light modulation apparatus 51, for example, and a light selecting unit 52. The scanning optical unit 56 includes a projection optical unit 53 and a scanning device 54. As the light source 1, there may be used an array laser in which a plurality of semiconductor laser devices are one-dimensionally arrayed or a semiconductor laser bar in which respective laser devices are integrally formed. It should be noted that laser light emitted from the laser devices one-dimensionally arrayed may be incident on a resonator having a wavelength converting device such as a non-linear optical device and a laser medium through the illumination optical system 20 of the one-dimensional illumination apparatus 10 having the arrangement according to an embodiment, thereby emitting higher harmonic waves.

Light Lo emitted from the light source 1 passes through the one-dimensional illumination apparatus 10, and the one-dimensional light modulation apparatus of the diffraction grating type arrangement, for example, is illuminated with one-dimensional (linear) light beams.

The diffraction grating light modulation apparatus 51 is actuated based on an image signal generated at an external calculating unit 150 in response to a signal Sp supplied from a driving circuit (not shown). In the case of the diffraction grating light modulation apparatus 51, diffracted light is incident on the light selecting unit 53. It should be noted that, in the case of using light of three primary colors, for example, light from a light source of each color may pass through a one-dimensional illumination apparatus and light modulation apparatus for each color, and then light beams are superimposed by a color superimposing unit such as an L-shaped prism to be emitted to the light selecting unit.

The light selecting unit 52 is formed of an Offner relay optical system or the like and includes a spatial filter (not shown) such as a Schlieren filter. The light selecting unit 52 selects, for example, +first-order light to be emitted as one-dimensional image light Lm. Further, the one-dimensional image light Lm is magnified by the projection optical unit 53, scanned by the scanning device 54 in the scanning optical unit 56 as shown with $L_1, L_2, \ldots L_{n-1}, L_n$, while the scanning device 54 is rotated in the direction shown by an arrow r in FIG. 22. Accordingly, a two-dimensional image 57 is generated on an image generation surface 100 such as a screen. The scanning is performed on the image generation surface 100 as shown by an arrow s in FIG. 22. A galvano-mirror, a polygon mirror or the like can be used as scanning device 54. Further, a resonant scanner which is resonated with an electromagnet or the like to perform scanning may also be used.

Figure 23:
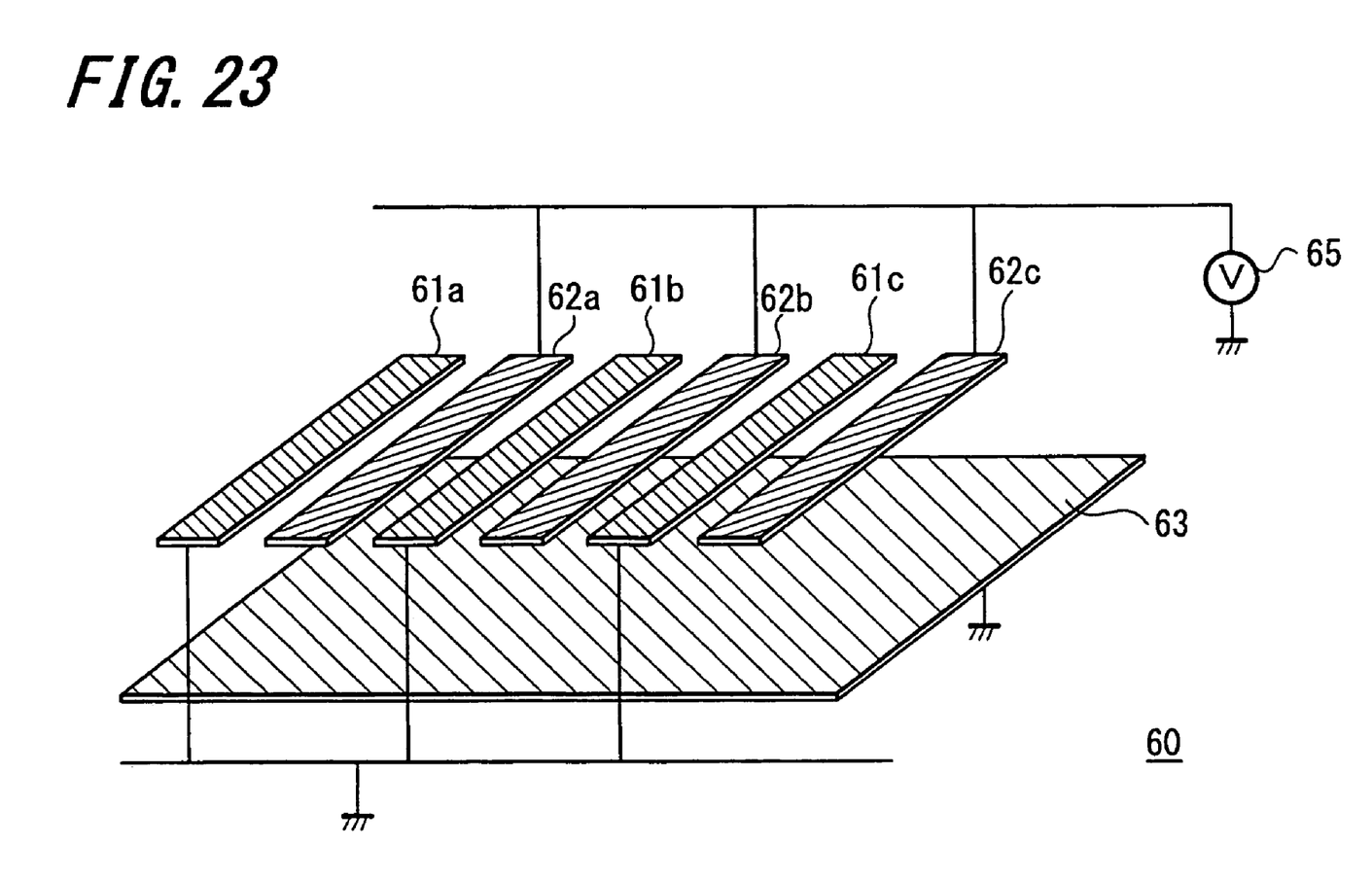
FIG. 23 is a schematic perspective view showing main portions of an example of a one-dimensional light modulation apparatus.

An example of a one-dimensional light modulation apparatus for use in such image generating apparatus will be described with reference to FIGS. 23 to 25. FIG. 23 is a schematic perspective view showing an arrangement of a light modulation device forming the light modulation apparatus according to an embodiment of the present invention. As shown in FIG. 23, a light modulation device 60 includes a substrate made of a material such as silicon. A common electrode 63 formed of a material such as a polysilicon thin film is formed on the substrate of the light modulation device 60. Strip-shaped first electrodes 61*a*, 61*b* and 61*c* and second electrodes 62*a*, 62*b* and 62*c* with reflective films formed on the surfaces thereof are alternately formed with a predetermined space between them and the common electrode 63. The first electrodes 61*a*, 61*b* and 61*c* have a fixed potential and are grounded, for example. The second electrodes 62*a*, 62*b* and 62*c* are formed as movable electrodes, that is, movable portions and connected to a drive voltage power supply 65.

In the case of the light modulation device 60 having the above-described arrangement, the first electrodes 61*a*, 61*b* and 61*c* are fixed, for example, so that the height of the reflective surface is invariable. The second electrodes 62*a*, 62*b* and 62*c* can be moved or bent toward the common electrode 63 due to force of attraction or repulsion caused by electrostatic force corresponding to a drive voltage so that a height of the reflective surfaces (for example, a space between them and the substrate) of the second electrodes 62*a*, 62*b* and 62*c* can be changed. The light modulation device 60 can function as a diffraction grating having a constant pitch and having a depth capable of being varied by moving or bending the second electrodes 62*a*, 62*b* and 62*c*.

It should be noted that in the light modulation device 60 the second electrodes 62*a*, 62*b* and 62*c* are modulated for one pixel in the light modulation apparatus, in response to pixel signals for one pixel. The number of the first electrodes and the second electrodes provided to the light modulation device 60 are not limited to six in the example shown in FIG. 23 and it can be changed to the suitable number such as two, four and the like. Thus, the number of the first electrodes 61*a*, 61*b*, 61*c* and the second electrodes 62*a*, 62*b* and 62*c* can be selected optionally. Further, the light modulation devices 60 corresponding to the number of pixels may be arrayed in the direction perpendicular to the longitudinal direction of each electrode, thereby forming a light modulation apparatus corresponding to the desired number of pixels. Specifically, the total number of the electrodes provided within the light modulation apparatus is arbitrarily selected in response to the number of electrodes per pixel and the number of pixels of a target image to be displayed.

An example of typical dimensions of the light modulation device 60 will be described. For example, the widths of the first electrodes 61*a*, 61*b* and 61*c* and the second electrodes 62*a*, 62*b* and 62*c* are selected in the range of 3 to 4 μm; a gap between adjacent electrodes is selected to be about 0.6 μm; and the length of the electrode is selected in the range of approximately 200 to 400 μm. In this case, assuming that six electrodes correspond one pixel, the light modulation device for one pixel may have a width of approximately 25 μm.

In a one-dimensional light modulation apparatus capable of displaying 1080 pixels and which is now being put into practical use, a large number of electrodes corresponding to 1080 pixels may be arrayed along the width directions of the first electrodes 61*a*, 61*b*, 61*c* and the second electrodes 62*a*, 62*b* and 62*c* shown in FIG. 23.

It should be noted that two kinds of configuration are proposed for the above-described diffraction grating light modulation apparatuses. One of the apparatuses is a light modulation apparatus having a typical arrangement in which surfaces of respective electrodes are substantially flush with each other when not moved or bent. The other is a light modulation apparatus having blazed gratings in which respective electrodes are inclined and located with predetermined angles from the reference plane (for example, substrate surface of light modulation apparatus). FIGS. 24 and 25 are schematic cross-sectional views showing arrangement of examples of such light modulation apparatuses. In FIGS. 24 and 25, elements and parts corresponding to those in FIG. 23 are denoted by the same reference numerals and are not described repeatedly. While the number of the first and second electrodes corresponds to one pixel, is three respectively, in other words, total six electrodes are provided in the examples shown in FIGS. 24 and 25, the number is not limited thereto.

Figure 24:
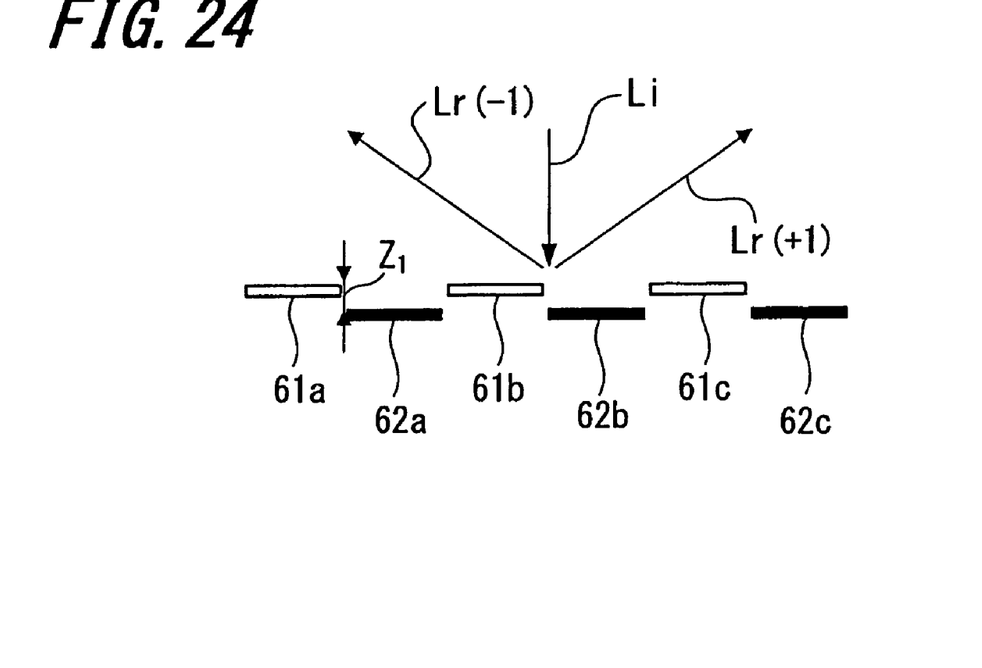
FIG. 24 is a schematic cross-sectional view showing main portions of an example of a one-dimensional light modulation apparatus.

FIG. 24 is a schematic cross-sectional view showing an example of the light modulation apparatus having a typical arrangement. As shown in FIG. 24, when a moving amount Z1 of the second electrodes 62*a* to 62*c* is selected to be λ/4 (λ is a wavelength of incident light), 0-th order diffracted light (not shown) is reflected in the direction opposite to the light incident direction and ± first-order diffracted lights Lr(+1) and Lr(−1) are reflected as diffracted light. For example, when the wavelength λ is 532 nm (λ=532 nm), a maximum moving amount of the second electrodes 62*a*, 62*b* and 62*c* is obtained by λ/4=133 nm. In the case where the +first-order diffracted light alone is used, only a ray of diffracted light is focused on the screen through a spatial filter (not shown) and it can be used to display images. When the light modulation apparatus is not actuated (when a drive voltage is set to zero), the +first-order diffracted light is not generated, so that such an OFF-state corresponds to a dark state of a screen, thereby making a display screen become black. Specifically, the moving amount Z1 of the second electrodes 62*a*, 62*b* and 62*c* is controlled by adjusting the drive voltage applied to the second electrodes 62*a*, 62*b* and 62*c* in response to image information supplied from the outside, thereby enabling the pixel to turn ON/OFF and gradation between ON and OFF of the pixel to be displayed.

Figure 25:
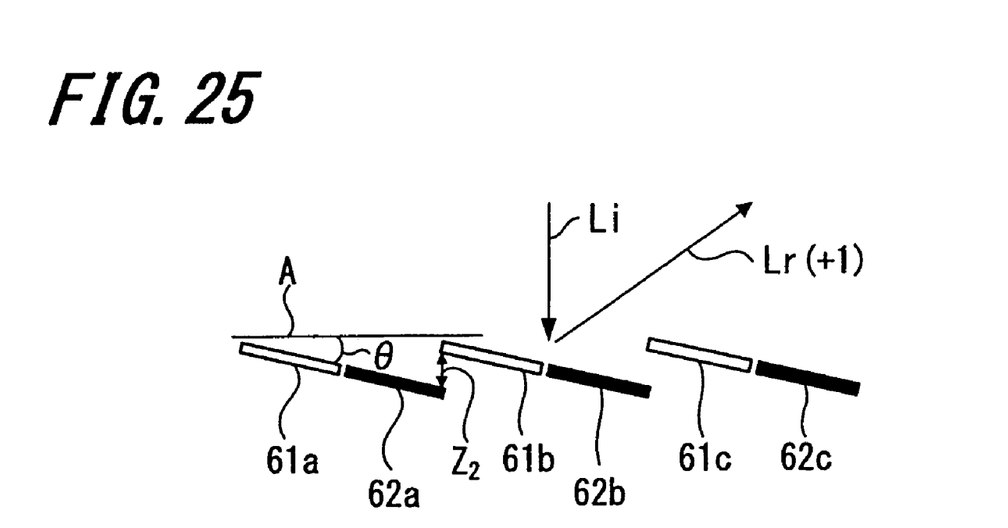
FIG. 25 is a schematic cross-sectional view showing main portions of another example of a one-dimensional light modulation apparatus.

On the other hand, in the light modulation apparatus having the blazed gratings, as shown in FIG. 25, the respective electrodes 61*a* to 61*c* and 62*a* to 62*c* are disposed with an inclination of a predetermined angle θ from a reference plane A, that is, plane parallel to the surface of a substrate (not shown) of the light modulation apparatus. Here, the angle θ is preferably selected to be an angle at which a difference of height of adjacent electrodes becomes λ/4 (λ is a wavelength of light in use) for the period corresponding to one electrode. Then, when the light modulation apparatus is actuated, the second electrodes 62a, 62b and 62c are moved such that the respective surfaces of the adjacent pair of first and second electrodes 61a and 62a, 61b and 62b and 61c and 62c may become flush with each other. At that time, when the light modulation apparatus is operated such that a moving amount Z2 of the second electrodes 62a, 62b and 62c may become λ/4 for the wavelength λ of incident light (that is, difference in level of λ/2 at the cycle of two electrodes), only the +first-order diffracted light is emitted. Accordingly, only a ray of diffracted light can be focused on the screen through the spatial filter (not shown) using such +first-order diffracted light. Specifically, in the case where the blazed grating light modulation apparatus is used, upon configuration in which a ray of diffracted light is used, efficiency in using light can be improved.

Since the image generating apparatus is configured using the above-described one-dimensional light modulation apparatus and the one-dimensional illumination apparatus according to an embodiment of the present invention, the one-dimensional light modulation apparatus can be illuminated uniformly by dividing and superimposing light and the occurrence of interference fringes can be suppressed. Hence, light can be modulated satisfactorily and it becomes possible to generate excellent images without deteriorating efficiency in using light.

It should be noted that the image generating apparatus according to an embodiment of the present invention is not limited to the above-described example, as long as the one-dimensional illumination apparatus according to an embodiment of the present invention is included, the light modulating unit, the projection optical unit and the scanning optical unit can be modified and changed. Also, an embodiment of the present invention is not limited to projection-type display apparatuses and can also be applied to laser printers capable of generating character information and images by drawing.

Also, the present invention is not limited to the arrangements described in the above-described embodiments and the number of assemblies, materials and arrangements of the optical elements in the wavefront superimposing unit and the like in the one-dimensional illumination apparatus, for example, can be modified and changed variously without departing from the arrangements of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A one-dimensional illumination apparatus comprising:
a light source including a plurality of laser devices arrayed one-dimensionally;
a wavefront dividing unit including one or more cylindrical lens arrays for dividing a wavefront of light emitted from the light source and superimposing divided wavefronts;
a waveform superimposing unit for introducing light from the wavefront dividing unit to an object and superimposing divided wavefronts; and
a polarization converting unit for rotating a plane of polarization of one laser beam of a pair of adjacent laser beams divided by the wavefront dividing unit, wherein
the polarization converting unit is located right in front of or right behind an optical element through which laser light from the light source finally passes in the wavefront dividing unit, and wherein a divergence angle of an incident laser is increased relative to a coupling angle of the lens array.

2. A one-dimensional illumination apparatus according to claim 1, wherein an equation of $$\cos\{(\psi+\theta)/2\} \leq NA$$

is satisfied, where θ is an angle at which each laser light emitted from each laser device of the light source is focused or caused to diverge, ψ is an angle at which laser beams emitted from all the laser devices of the light source are focused or caused to diverge, and NA is a numerical aperture of a cylindrical lens array on the light incident side provided to the wavefront dividing unit.

3. A one-dimensional illumination apparatus according to claim 1, wherein
laser light emitted from one laser device of the light source is incident over two or more and less than four lens cells of the cylindrical lens array.

4. A one-dimensional illumination apparatus according to claim 1, wherein an equation of $$\psi+\theta \leq \phi$$

is satisfied, where φ is a coupling angle of the cylindrical lens array, θ is an angle at which each laser light emitted from each laser device of the light source is focused or caused to diverge and ψ is an angle at which laser beams emitted from all the laser devices of the light source are focused or caused to diverged.

5. A one-dimensional illumination apparatus according to claim 1, wherein
a pitch $P_L$ of a lens cell of the cylindrical lens array is approximately $d_{sc}/2$, where $d_{sc}$ is a spatial coherence distance of laser light emitted from a laser device of the light source.

6. A one-dimensional illumination apparatus according to claim 1, further comprising
an optical element located in the vicinity of the wavefront dividing unit and having a function of increasing an angle θ at which laser light emitted from each laser device of the light source diverges.

7. A one-dimensional illumination apparatus according to claim 6, wherein
the cylindrical lens array, through which laser light from the light source first passes, in the one or more cylindrical lens arrays has the function of the optical element.

8. An image generating apparatus comprising:
a light source;
a one-dimensional illumination apparatus;
a one-dimensional light modulation apparatus;
a projection optical unit; and
a scanning optical unit, wherein
the one-dimensional illumination apparatus includes;
a light source including a plurality of laser devices arrayed one-dimensionally;
a wavefront dividing unit including one or more cylindrical lens arrays for dividing a wavefront of light emitted from the light source and superimposing divided wavefronts;
a waveform superimposing unit for introducing light from the wavefront dividing unit to an object and superimposing divided wavefronts; and
a polarization converting unit for rotating a plane of polarization of one laser beam of a pair of adjacent laser beams divided by the wavefront dividing unit, wherein
the polarization converting unit is located right in front of or right behind an optical element through which laser light from the light source finally passes in the wavefront dividing unit, and wherein a divergence angle of an incident laser is increased relative to a coupling angle of the lens array.

* * * * *